United States Patent [19]

Nakada

[11] Patent Number: 5,970,955
[45] Date of Patent: Oct. 26, 1999

[54] FUEL INJECTION CONTROL METHOD AND SYSTEM IN A CYLINDER-INSIDE DIRECT INJECTION TYPE SPARK IGNITION COMBUSTION ENGINE

[75] Inventor: Naoki Nakada, Chiba, Japan

[73] Assignee: Nissan Motor Co., Ltd., Yokohama, Japan

[21] Appl. No.: 09/034,324

[22] Filed: Mar. 4, 1998

[30] Foreign Application Priority Data

Mar. 4, 1997 [JP] Japan ..................... 9-049330

[51] Int. Cl.$^6$ .................................................. F02M 51/00
[52] U.S. Cl. ............................................ 123/491; 123/305
[58] Field of Search ................................ 123/491, 478, 123/480, 305

[56] References Cited

U.S. PATENT DOCUMENTS

| | | | |
|---|---|---|---|
| 5,150,692 | 9/1992 | Trombley et al. ................... | 123/533 |
| 5,507,265 | 4/1996 | Ichikawa et al. ................... | 123/478 |
| 5,515,831 | 5/1996 | Yonekawa .......................... | 123/491 |
| 5,577,483 | 11/1996 | Suedholt et al. ................... | 123/491 |
| 5,605,137 | 2/1997 | Priestly et al. .................... | 123/491 |
| 5,697,347 | 12/1997 | Enomoto et al. ................... | 123/502 |
| 5,735,249 | 4/1998 | Parke et al. ....................... | 123/478 |
| 5,743,236 | 4/1998 | Kawakami ......................... | 123/491 |
| 5,836,288 | 11/1998 | Nakagawa ......................... | 123/491 |
| 5,881,697 | 3/1999 | Schott et al. ...................... | 123/491 |

FOREIGN PATENT DOCUMENTS

| | | |
|---|---|---|
| 0 527 659 | 2/1993 | European Pat. Off. . |
| 8-193536 | 7/1996 | Japan . |

*Primary Examiner*—John Kwon
*Attorney, Agent, or Firm*—Foley & Lardner

[57] ABSTRACT

A fuel injection control method and system in a multi-cylinder direct injection type internal combustion engine. A first sensor detects whether the engine is in a start-up condition and, upon detection, generates a start-up signal. A second sensor generates an engine operating condition indicative signal. A third sensor detects an operative condition of the fuel pump. A basic period of injection based on the second sensor signal is calculated. A decrease in injection amount based on the fuel pump operative conditions sensed by the third sensor is determined and the basic period of injection is modified to compensate for the decrease in the injection amount. The injection valves are controlled according to the modified injection period.

15 Claims, 4 Drawing Sheets

FUEL INJECTION CONTROL METHOD AND SYSTEM IN A CYLINDER-INSIDE DIRECT INJECTION TYPE SPARK IGNITION COMBUSTION ENGINE

BACKGROUND OF THE INVENTION

The present invention relates to a fuel injection control method and a system for a cylinder-inside direct injection type spark ignition internal combustion engine, and more particularly to a control method and system for controlling the duration of an injection period at low engine-speeds and heavy engine loading.

Japanese Patent Provisional Publication No. 8-193536 discloses a cylinder-inside direct injection type spark ignition internal combustion engine. In this publication, fuel injection is carried out by setting an injection pulse width at the engine start-up timing and suitably setting the fuel injection timing, in accordance with the coolant temperature at engine start-up.

However, in such a conventional engine, the fuel is highly pressurized by a high pressure fuel pump driven either by a camshaft or a crankshaft of the engine and injected from a fuel injector valve into an associated cylinder. Therefore, the fuel pressure is lowered because of the influence of injection during the engine start-up period, especially when the engine temperature is low. A long fuel injection period is required, however, the injection pulse width is determined in accordance with the fuel pressure at the injection start-up timing. Consequently, the effective injection amount per unit time becomes less due to a drop in the pressure so that the actual injection amount decreases, thereby degrading the engine starting operability Also, the response characteristics of the control procedure is limited in such conventional systems even when a fuel pressure sensor is provided, and therefore, it is difficult to timely consider the lowering of the fuel pressure at the injection detected during fuel injection to adjust the control. In other words, once a fuel injection rate has been determined and applied to an injector, it is difficult to adjust or extend the injection period during injection.

SUMMARY OF THE INVENTION

An object of the invention is to solve such conventional problems and provide a control method and system in which the engine starting ability is improved.

In this invention, a sufficient amount of injection time is estimated by considering the lowering in the injection rate beforehand, i.e., at a time prior to the injection to a cylinder at engine start-up timing. It is important to note that at engine start-up, the engine speed is low (low in pump revolution and small in discharge amount) and the required injection pulse width is long (due to cold engine conditions).

According to the invention, the actual injection amount is prevented from being reduced due to the lowering of the fuel pressure (injection rate) under the influence of self-injection during injection at the engine start-up timing.

In one embodiment of the invention, first, the injection rate lowering conditions are detected. The injection rate lowering conditions include: a) whether the fuel pressure "Pf" at the start of the injection is not higher than a predetermined value, b) whether the engine speed "Ne" is not higher than a predetermined value, and c) whether the engine start-up timing injection pulse width "TIST" is not lower than a predetermined value. Next, the lowered amount of the injection rate is predicted based on the fuel pressure Pf, the engine speed Ne, and the injection pulse width TIST at the engine start-up timing. Thereafter, a correction coefficient K, by which the engine start-up timing injection pulse width TIST should be corrected, is calculated. Finally, the injector is controlled based on the calculated injection pulse width.

BRIEF DESCRIPTION OF THE DRAWINGS

The invention will be described in further detail below with reference to the drawings, wherein.

DETAILED DESCRIPTION OF THE PREFERRED EMBODIMENTS

Figure 1:
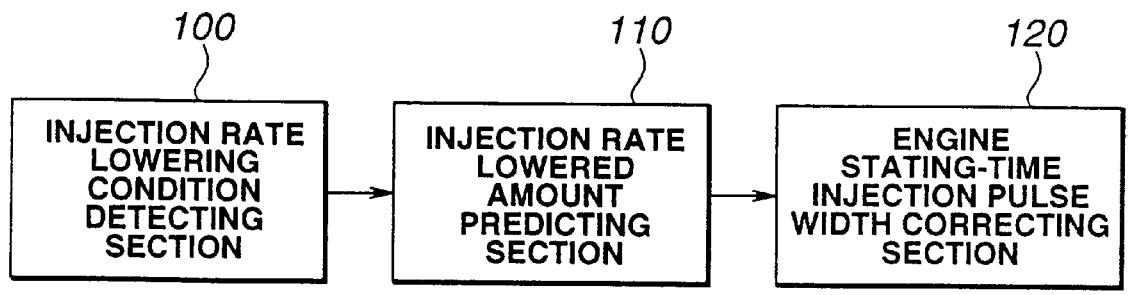
FIG. 1 is a block diagram of the invention.

Referring now to the drawings, FIG. 1 is a block diagram of the invention. The invention includes an injection rate lowering condition detecting section 100 for detecting the conditions (i.e., fuel pressure, engine speed, and the injection pulse width) that indicate a lowering of the injection rate; an injection rate lowered amount predicting section 110 for determining the amount of the lowered injection rate; and an engine start-up timing injection pulse width correcting section 120 for modifying the injection pulse width based on the amount determined in section 110. The injection rate lowering condition detecting section 100 is implemented by steps S2 to S4 of a flowchart shown in FIG. 3 and described later; the injection rate lowered amount predicting section 110 is implemented by steps S5 to S8 of the flowchart; and the engine start-up timing injection pulse width correcting section 120 is implemented by step S9 of the same flowchart.

Figure 2:
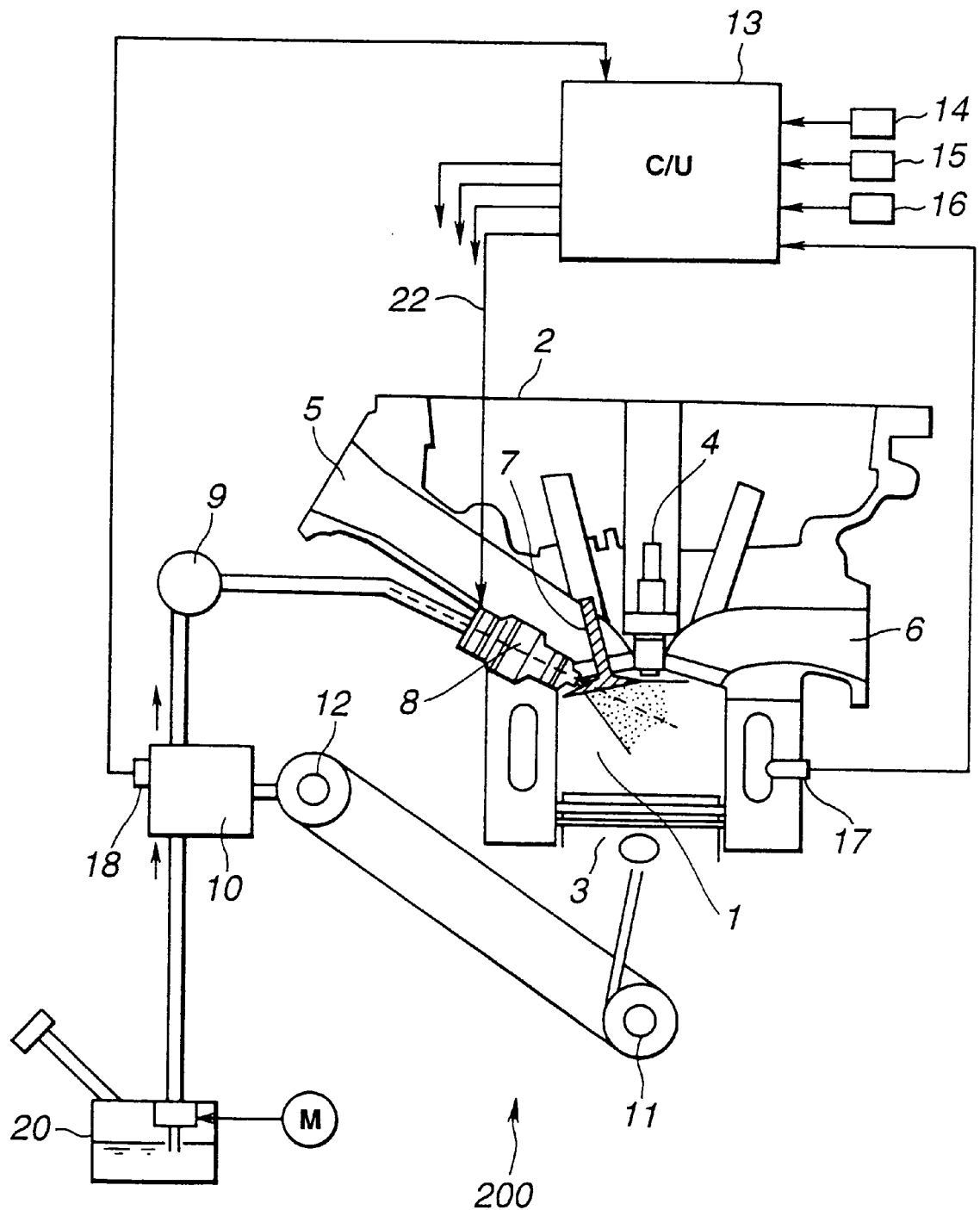
FIG. 2 is a view of a system arrangement showing an injection control system of an ignition combustion engine in an embodiment of the invention.

FIG. 2 is an illustration of one specific embodiment of the invention. In FIG. 2, a cylinder-inside direct injection type spark ignition internal combustion engine 200 is shown. A combustion chamber 1 of each cylinder is formed between a cylinder head 2 and a piston 3. A spark plug 4 is disposed at the central section on the cylinder head 2 side; and an intake port 5 and an exhaust port 6 are formed around the spark plug 4. An intake valve and an exhaust valve (not shown) are installed respectively at the intake and exhaust ports.

A fuel injector valve (injector) 8 is provided for each cylinder so as to inject fuel directly into the inside of the combustion chamber 1. Fuel is supplied from a fuel gallery 9 which is common to all cylinders.

A high pressure fuel pump 10 is provided which is driven by a camshaft, which in turn is driven through a belt by crankshafts 11 and 12 of the engine and adapted to further pressurize fuel from an electric motor M driving a low pressure fuel pump 20. The high pressure fuel pump raises the pressure level to about 0.3 MPa, sucks and discharges fuel inside a fuel tank, and supplies the fuel into the fuel gallery 9. The high pressure fuel pump 10 is provided at its discharge side with a high pressure regulator (not shown) so that the fuel pressure can be regulated at a predetermined value to provide relief, if the fuel pressure exceeds the predetermined value.

Each of the fuel injector valves 8 is controlled independently. The valve 8 is opened upon being energized under the action of an injection pulse signal 22 received from a control unit 13. The control unit 13 can be in the form of, for example, a Hitachi microprocessor, SH7051, programmed in machine language to implement the flowchart provided herein. The fuel injector valve 8 is closed upon being de-energized, as a result of which a fuel injection rate or period is controlled in accordance with the pulse width of the injection pulse signal 22.

A variety of signals are input to the control unit 13. These signals are received from various sensors including a crank angle sensor 14 for outputting a signal every unit crank angle, a cylinder discrimination sensor 15, an airflow meter 16 for detecting an intake air flow amount Qa, a coolant temperature sensor 17 for detecting a coolant temperature Tw, a fuel pressure sensor 18 for detecting a fuel pressure Pf downstream of the high pressure fuel pump 10, and the like, in order to control the fuel injection amount. The fuel pressure sensor 18 detects the pressure in the fuel gallery 9. In FIG. 2, the pressure sensor 18 is positioned at the discharge side. The invention is, of course, not limited to this particular arrangement. For example, the fuel pressure sensor 18 can be placed somewhere else as long as it is capable of sensing the pressure in the fuel gallery 9 which is normally connected to each injector.

The crank angle sensor 14 outputs a standard pulse signal REF at a predetermined crank angle position at an interval of a crank angle of about $720°/n$, wherein the number of the cylinders is n; and outputs a unit pulse signal POS at an interval of about $1°$ or $2°$, thereby the engine speed Ne can be calculated in accordance with the period of the standard pulse signal REF. Additionally, the cylinder discrimination sensor 15 (camshaft sensor), is provided to output a cylinder discrimination signal PHASE corresponding to a specified cylinder at a predetermined crank angle position and at an interval of the crank angle of about $720°$.

Next, the fuel injection control procedure at the time of engine starting carried out by the control unit 13 will be described with reference to the flowchart of FIG. 3.

Figure 3:
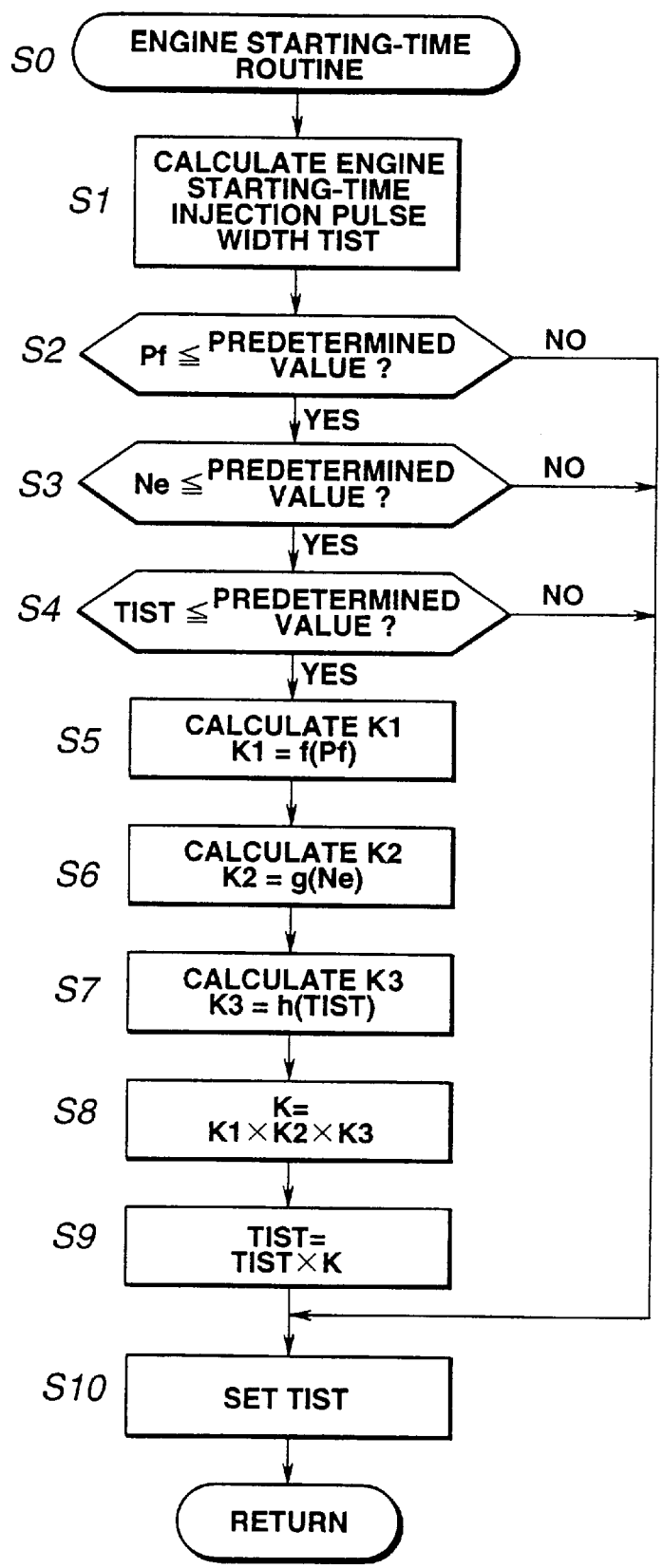
FIG. 3 is a flowchart of a fuel injection control routine executed at engine start-up timing in an embodiment of the invention.

The flowchart of FIG. 3 illustrates the processing which is carried out by the control unit 13 using software, hardware, or a combination of software and hardware.

It should be noted that the routine shown in FIG. 3 is processed during the start-up operation of the engine, i.e., from when the starter switch is turned ON through the time at which the engine speed exceeds about 1000 rpm, the routine executing in about 1 second.

At a step S0, the engine start-up timing routine is processed concurrently with the standard pulse signal REF, or at a time at which the unit pulses signal POS have been counted a predetermined number of times since the generation of the standard pulse signal REF, when a condition, such as the starter switch being switched ON is met. Such control method is described in, for example, U.S. patent application Ser. No. 08/926,490 to Hiroto Nishide, entitled "FUEL INJECTION CONTROL METHOD AND SYSTEM IN A DIRECT INJECTION TYPE GASOLINE INTERNAL COMBUSTION ENGINE", filed Sep. 10, 1997 and assigned to the assignee of this application, the entire contents of which is incorporated herein by reference.

At a step S1, a basic engine start-up timing injection pulse width TIST is determined on the basis of data, such as coolant temperature TW. Next, advance is made to a step S2.

At the step S2, the fuel pressure Pf (the fuel pressure at starting of injection) is compared with a predetermined value Pfr, and a judgment is made as to whether the $Pf \leq$ the predetermined value Pfr (for example, 5 MPa). If $Pf \leq$ the predetermined value Pfr, advance is made to a step S3. If Pf>the predetermined value Pfr, it is judged that the injection rate has not lowered and advance is made to a step S10 where the basic engine start-up time injection pulse width TIST is stored, for example, in a register and the routine is terminated.

At the step S3, the engine speed Ne is compared with a predetermined value Ner, and a judgment is made as to whether $Ne \leq$ the predetermined value Ner (for example 1,000 rpm). If $Ne \leq$ the predetermined value Ner, advance is made to a step S4. If Ne>the predetermined value Ner, it is judged that the injection rate has not lowered and advance is made to the step S10 where the basic engine start-up time injection pulse width TIST is stored and the routine is terminated.

At the step S4, the injection pulse width TIST is compared with a predetermined value TISTr, and a judgment is made as to whether $TIST \geq$ the predetermined value TISTr (for example, 10 milliseconds). If $TIST \geq$ the predetermined value TISTr, advance is made to a step S5. If TIST<the predetermined value TISTr, it is judged that the injection rate has not lowered and advance is made to the step S10 where the basic engine start-up time injection pulse width TIST is stored and the routine is terminated.

Thus, if $Pf \leq$ the predetermined value (step S2), and $Ne \leq$ the predetermined value (step S3), and $TIST \geq$ the predetermined value (step S4), an injection rate lowering condition, indicating that the injection rate has been lowered, is established and correction processing is next performed in steps S5 to S9 described below.

Figure 4:
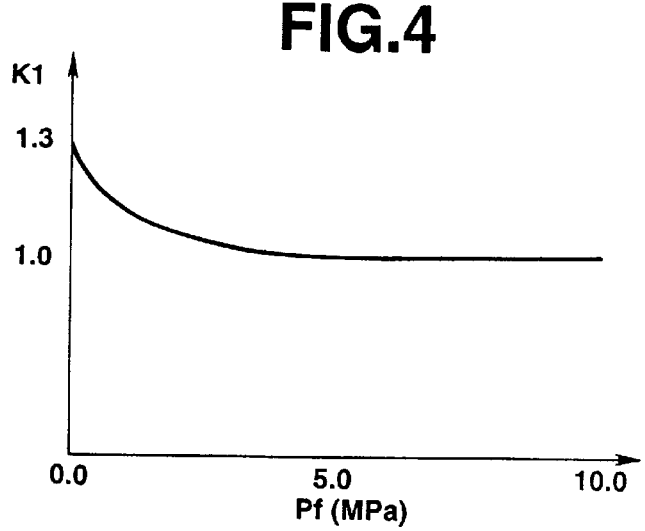
FIGS. 4 to 6 are respectively function tables for correction coefficients K1, K2 and K3.

At the step S5, a first correction coefficient is obtained by using the equation: $K1=f(Pf)$ to compensate for the lowered injection rate amount, based on the fuel pressure Pf detected at the starting of injection by using a predetermined function table f as shown in FIG. 4. The correction coefficient K1 is set to a higher value since the effective injection amount decreases with the lowering in the fuel pressure Pf at the starting of injection. Next, advance is made to a step S6.

Figure 5:
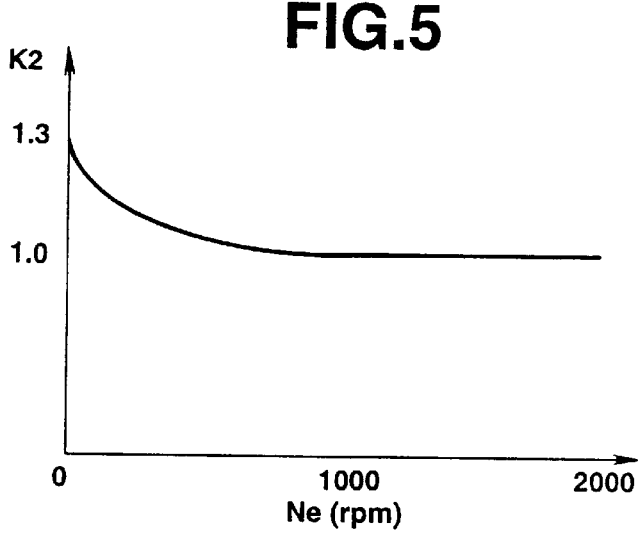

At the step S6, a second correction coefficient is obtained by using the equation: $K2=g(Ne)$ to compensate for the lowered injection rate amount based on the engine speed Ne by using a predetermined function table g as shown in FIG. 5. Again, the correction coefficient K2 is set to a higher value since the lowering in the effective injection amount increases with decreasing engine revolutions. Advance is next made to a step S7.

Figure 6:
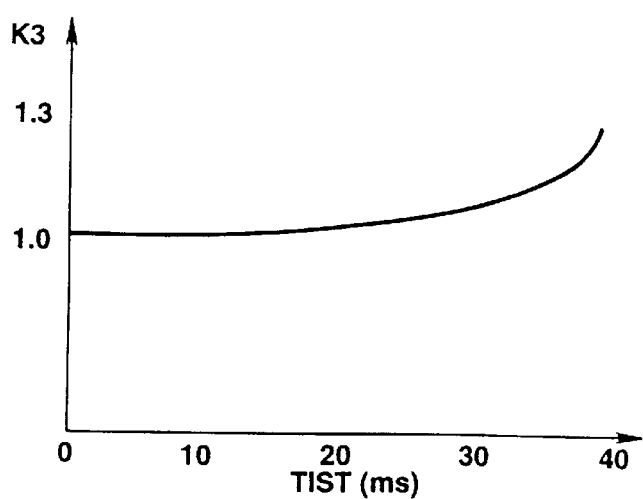

At the step S7, a third correction coefficient is obtained by using the equation: $K3=h(TIST)$ based on the engine start injection rate TIST in accordance with a predetermined function table h as shown in FIG. 6. The coefficient value K3 is set to a higher value since the lowering in the effective injection amount increases with an increase in the TIST value. Next, advance is made to a step S8.

At the step S8, a final correction coefficient is calculated by using the equation: $K=K1 \times K2 \times K3$, i.e., the final correction coefficient is obtained by multiplying the first to third correction coefficients K1 to K3. Advance is next made to a step S9.

At the step S9, the basic engine start-time injection pulse width TIST, as calculated in step S1, is modified using the final correction coefficient K according to the equation $TIST=TIST \times K$, and the engine start-up timing injection pulse width TIST is increased to a higher value.

In this particular embodiment, with the above-described processing, the duration of the injection period is increased, for example, by 10%–20% when all of the conditions of steps S5 through S9 are satisfied.

Next, advance is made to the step S10. At the step S10, the engine start-up timing injection pulse width TIST modified at step S9 is stored, and the routine is terminated.

Furthermore, the modified pulse width TIST is applied to a specific injection cylinder, so that each cylinder is supplied sequentially with an appropriate amount of injection fuel, calculated on the basis of the current engine operation conditions.

More particularly, with the modified engine start-up timing injection pulse width TIST, an injection pulse signal having an extended pulse width TIST is output to the fuel injector valve 8 at a predetermined injection timing. Note that generally during engine start-up conditions, an air intake stroke for each cylinder during cold start-up operation fuel is injected in a cylinder between 300–260° C. BTOC and 200° C. BTOC to ensure so-called uniform combustion of the fuel thereby accomplishing satisfactory fuel injection control. In contrast, during normal operation, a stratified injection is conducted during a compression stroke.

The entire contents of Japanese Patent Application No. 9-49330, filed on Mar. 4, 1997, is incorporated herein by reference.

Although the invention has been described above in connection with certain specific embodiments of the invention, the invention is not limited to the specific embodiments described above. Modifications and variations of the embodiments described above will occur to those skilled in the field.

What is claimed is:

1. In a fuel injection control system for a multi-cylinder internal combustion engine of a direct injection type, comprising a fuel pump driven by the engine, a fuel injection valve connected to the fuel pump via a fuel pipe and disposed in a combustion chamber of each cylinder for injecting fuel responsive to an injection signal supplied by a control unit, said control system comprising:

a first sensor for detecting whether the engine is in a start-up condition and, upon detection, generating a start-up signal;

a second sensor for generating an engine operating condition indicative signal;

a third sensor for detecting an operative condition of the fuel pump;

means, responsive to the start-up signal, for calculating a duration of a basic period of injection based on the second sensor signal;

means for predicting a decrease of actual injection amount based on the fuel pump operative condition;

means, when the decrease is predicted, for modifying the basic period of injection; and means for controlling the fuel injection valve based on the modified period of injection.

2. The fuel injection control system as claimed in claim 1, wherein the third sensor includes a pressure sensor disposed in a fuel line downstream of the fuel pump.

3. The fuel injection control system as claimed in claim 2, wherein the third sensor includes an engine revolution sensor.

4. The fuel injection control system as claimed in claim 3, wherein the modification of the basic period of injection is conducted when the fuel pressure detected is below a first predetermined value, the engine speed is below a second predetermined value, and the basic period of injection calculated exceeds a third predetermined value.

5. The fuel injection control system as claimed in claim 4, wherein the amount of modification is based on the fuel pressure, the engine speed and the basic period of injection.

6. The fuel injection control system as claimed in claim 1, wherein the basic and modified periods of injection are calculated for each injection valve prior to a predetermined crank angle procedure of each injection valve.

7. The fuel injection control system as claimed in claim 1, wherein the multi-cylinder internal combustion engine includes a gasoline engine.

8. The fuel injection control system as claimed in claim 1, wherein the multi-cylinder internal combustion engine includes a diesel engine.

9. The fuel injection control system as claimed in claim 1, further comprising a fuel gallery connected to each injection valve.

10. A method for controlling a direct injection engine including a fuel injector disposed in a cylinder, a fuel pump driven by the engine, the method comprising the steps of:

1) detecting whether the engine is in a start-up condition;

2) detecting a vehicle operative condition;

3) calculating a basic duration of injection period based on the detected vehicle operative condition responsive to the detection of the engine start-up condition;

4) determining whether to modify the basic duration of injection period based on an operative condition of the fuel pump;

5) modifying the basic duration period of injection in accordance with the determination in step 4); and 6) controlling the fuel injector in accordance with the modified duration period of injection.

11. The control method claimed in claim 10, wherein the modification of the period of injection is performed for each cylinder prior to an injection procedure.

12. The control method claimed in claim 11, wherein an injection timing is set to start at a predetermined crank angle during an intake stroke to establish uniform combustion of fuel.

13. A fuel injection control system for a multi-cylinder internal combustion engine of direct injection type, comprising:

a fuel injection valve disposed in a combustion chamber of each engine cylinder;

a sensor for generating a sensor signal indicative of an engine operating condition;

a control unit, responsive to the sensor signal, for calculating a basic period of injection and an injection start-up timing thereof relative to a reference crank angle position with respect to each engine cylinder;

means for determining whether to modify the basic injection period;

means, responsive to the determination of the modification, for calculating a compensated value;

means for starting fuel injection at a predetermined crank angle during an intake stroke; and means for terminating the injection when the calculated time duration of the compensated value expires.

14. A vehicle, comprising:

(a) a direct injection combustion engine;

(b) a fuel pump connected to the internal combustion engine to be driven thereby;

(c) a first sensor to sense engine start-up and generate an engine start-up signal;

(d) a second sensor to sense a vehicle operative condition;

(e) a third sensor to sense a discharge performance of the fuel pump; and (f) a control unit for (1) calculating, in response to the engine start-up signal generated by the first sensor, a basic fuel injection period based on the vehicle operative condition, (2) modifying the basic fuel injection period based on a comparison between the calculated basic fuel and the discharge performance sensed by the third sensor, and (2) applying the modified fuel injection period to an injector.

15. A vehicle as claimed in claim 14, wherein said third sensor comprises:

(1) a first detector to detect a fuel pressure at a discharge side of said fuel pump;

(2) a second detector to detect an engine speed; and (3) a third detector to detect the basic fuel injection period.

* * * * *